(12) United States Patent
Jang

(10) Patent No.: US 6,628,863 B2
(45) Date of Patent: Sep. 30, 2003

(54) LONG-PERIOD OPTICAL FIBER GRATING

(75) Inventor: Joo-Nyung Jang, Seoul (KR)

(73) Assignee: Samsung Electronics Co., Ltd, Suwon (KR)

( * ) Notice: Subject to any disclaimer, the term of this patent is extended or adjusted under 35 U.S.C. 154(b) by 13 days.

(21) Appl. No.: 09/761,161

(22) Filed: Jan. 16, 2001

(65) Prior Publication Data

US 2001/0022880 A1 Sep. 20, 2001

(30) Foreign Application Priority Data

Jan. 14, 2000 (KR) ......................................... 2000-1744

(51) Int. Cl.[7] ................................................ G02B 6/26
(52) U.S. Cl. .......................................... 385/37; 385/123
(58) Field of Search .............................. 385/37, 10, 15, 385/27, 31, 39, 123; 359/566–576

(56) References Cited

U.S. PATENT DOCUMENTS

| | | | |
|---|---|---|---|
| 5,367,588 A | * 11/1994 | Hill et al. ...................... | 264/2.6 |
| 5,604,829 A | * 2/1997 | Bruesselbach ................ | 359/569 |
| 5,666,224 A | 9/1997 | Wood et al. .................. | 359/573 |
| 5,742,433 A | 4/1998 | Shiono et al. ............... | 359/575 |
| 5,867,304 A | 2/1999 | Galvanauskas et al. ..... | 359/333 |
| 5,881,188 A | * 3/1999 | Starodubov .................. | 359/566 |
| 5,992,181 A | 11/1999 | Geertman ..................... | 65/392 |
| 6,004,703 A | * 12/1999 | Jang et al. .................... | 430/5 |
| 6,298,183 B1 | * 10/2001 | Yamauchi et al. ............ | 385/37 |
| 6,307,994 B1 | * 10/2001 | Paek et al. ................... | 385/127 |
| 6,430,342 B1 | 8/2002 | Kim et al. ..................... | 385/37 |

FOREIGN PATENT DOCUMENTS

| | | | | |
|---|---|---|---|---|
| KR | WO 9900224 | * 11/1999 | ............ | G02B/6/16 |
| WO | WO 99/59010 | 11/1999 | ............ | G02B/6/16 |
| WO | WO 99/67668 | 12/1999 | ................. | 385/37 |

* cited by examiner

Primary Examiner—Frank G. Font
Assistant Examiner—Kevin C Kianni
(74) Attorney, Agent, or Firm—Cha & Reiter

(57) ABSTRACT

Disclosed is a long-period optical fiber grating according to the present invention. The long-period optical fiber grating includes a plurality of sections. The sections have a different grating periodicity. The distribution of the grating periodicity is asymmetric around a central reference section. Also, the sections have their lengths twice, or longer, as the respective grating periodicity.

15 Claims, 13 Drawing Sheets

LONG-PERIOD OPTICAL FIBER GRATING

CLAIM OF PRIORITY

This application claims priority to an application entitled, "Long Period Optical Fiber Grating", filed in the Korean Industrial Property Office on Jan. 14, 2000 and there duly assigned Ser. No. 2000-1744.

BACKGROUND OF THE INVENTION

1. Field of the Invention

The present invention generally relates to an optical fiber grating, and more particularly, to a long-period grating device configured for enhanced transmittance characteristics.

2. Description of the Related Art

In general, a typical way of forming an optical fiber grating is characterized in that beams of ultraviolet rays are illuminated on a photosensitive optical fiber in order to modify the refractive index of an optical fiber.

When the ultraviolet rays are irradiated on the photosensitive optical fiber, the changed refractive index of the optical fiber typically lasts for a very long time. Normally germanium-doped fibers tend to be known to exhibit such permanent characteristics, but today there are various other materials containing no germanium elements that can exhibit the same result.

FIG. 1 is a diagram illustrating a long-period optical fiber with a constant grating periodicity according to a related art. The long-period optical fiber 112 in FIG. 1 includes a grating portion of length $L_{11}$ with a constant grating periodicity $A_{11}$.

FIG. 2 is a diagram illustrating a method for fabricating the long-period grating 112 that is shown in FIG. 1. The conventional method of fabricating the long-period optical fibers is similar to the process involved in the photolithography, and this type of technique is often utilized by the semiconductor manufacturing companies. In particular, the conventional method is characterized by irradiating the ultraviolet rays through an amplitude mask 113 composed of a plurality of slits 114 to form a similar pattern of the amplitude mask onto the optical fiber 111. After being exposed to this type of illumination, the long-period grating 112 obtains a prescribed periodicity $A_{11}$ along the length $L_{11}$ of the optical fiber 111. Furthermore, a lens system (not shown) including a plurality of lenses is operatively secured to the top of the amplitude mask 113 in order to selectively modify the periodicity $A_{11}$ of the long-period optical fiber 112. Thus, the shape of the amplitude mask 113 can be varied to adjust the pattern formed along the optical fiber 111.

FIG. 3 is a perspective view illustrating the amplitude mask 113 shown in FIG. 2. The amplitude mask 113 has a specific periodicity $A_{12}$ and includes a plurality of aligned slits 114 that is similar to the parallel pattern formed along the long-period optical fiber 112, as shown in FIG. 2.

FIG. 4 is a simplified block diagram illustrating an optical fiber amplifier with a conventional attenuator coupled thereto. Optical signals propagating inside the optical fiber 141 are attenuated due to the loss characteristics of the optical fiber 141. Thus, a switching must be done at either the optical signal's point of origination or termination. The switching machine generally includes an optical amplifier for amplifying the attenuated optical signals. Before the optical amplifier is amplified, the optical signals have to be amplified in an electric manner. To this end, the optical signals are converted into electric signals, then the converted electric signals are amplified. Thereafter, the amplified electric signals are converted into optical signals.

Alternatively, the optical signals can be amplified without converting into electric signals if an optical amplifier is utilized for amplification. The most popular optical amplifier is an erbium-doped fiber amplifier, which amplifies optical signals directed inside the optical fiber through the population inversion of erbium ion. FIG. 4 illustrates the erbium-doped optical amplifier 142 including an optical fiber 141 acting as an optical signal transmitter, isolators 143 and 149 for interrupting the flow of reverse light, an erbium-doped optical fiber 146 for amplifying the optical signals, pumping sources 144 and 148 outputting pumping light for filtering the erbium ions within the erbium-doped optical fiber 146, and optical couplers 145 and 147 for coupling the pumping light with the optical fiber 141. Here, an attenuator is typically secured to one end of the erbium-doped optical fiber amplifier 142 to flatten the gain curve of the peak wavelength of the erbium-doped optical fiber amplifier 142.

Referring to FIG. 4, when optical signals are inputted from, for example, nine different channels with varying signal strength into the erbium-doped optical fiber amplifier 142 to be amplified, the power distribution of the optical signals outputted from the erbium doped optical fiber amplifier 142 is irregular for each different channel as the wavelength gain is not uniform when amplifying optical signals originated from different sources. As the wavelength division multiplexing method is currently used to transmit or receive a plurality of channels through a single optical fiber, the wavelength intervals between the channels are becoming shorter due to the limited wavelength band. Thus, if the power distribution from the respective channel is irregular as noted above, the probability of losing information transmitted from the respective channel is drastically increased due to noise or interference between the channels. Furthermore, as the additional attenuator 150 with an optical fiber grating 151, 152, and/or 153 is deployed to flatten the power of the amplified optical signals for the respective channel in the prior art system, the attenuator 150 produces a loss curve of a Gaussian-like function type, representing a peak value in its peak wavelength. If the wavelength band of the transmitted optical signals is narrow, only one of the long-period grating 151, 152 or 153 would be required for gain flattening function. However, in case of a broad wavelength band, multiple long-period gratings 151, 152 and 153 are used for the gain flattening function in the conventional system.

FIG. 5 is a diagram illustrating a method for flattening the gain curve of the erbium-doped optical fiber amplifier according to the conventional attenuator, as described in the preceding paragraphs. As shown in FIG. 5, if the wavelength band being used today ranges from 1525 nm to 1565 nm. Thus, flattening the gain curve of the erbium-doped optical fiber amplifier in this range is almost impossible using only one of the loss curves LPG. Here, the shape of the LPG curve is similar to the Guassian-like function type.

During the gain flattening process, as described above, more loss in the wavelength occurs if there is more gain in the wavelength after the amplification, whereas less loss in the wavelength occurs for less gain in the wavelength. Thus, the entire loss curve (attenuator) formed by the overlapping two or more optical fiber gratings exhibits, preferably, the similar shape to the gain curve of the erbium-doped optical fiber amplifier. As a result, the entire gain curve EDFA+ attenuator becomes flattened to some extent since the curve is formed by the combination of the erbium-doped optical fiber amplifier and the two or more optical fiber gratings.

As described above, if the current trend is utilizing more broader band and if the gain resulted from a broader range of wavelength band inputted to the erbium-doped optical fiber is large, multiple long-period gratings are required in the prior art system for attenuation purposes, thereby disadvantageously deteriorating the integration of the attenuator. In addition, the loss curves of the respective long-period gratings do not have a variety of shapes with the combination of the loss curves, thereby hardly obtaining a loss curve of desired shape except a specific type, such as a Gaussian-like function.

SUMMARY OF THE INVENTION

It is, therefore, an object of the present invention to provide a long-period grating capable of realizing various loss curves for various channels.

It is another object of the present invention to provide a long-period grating applicable over a broad, wavelength band.

Accordingly, there is provided a long-period grating according to the present invention which includes a plurality of sections having different grating periodicity whose distribution is asymmetrical around a particular reference section whose length is twice or longer, as the grating periodicity, thereby enabling the realization of a variety of loss curves by wavelengths.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
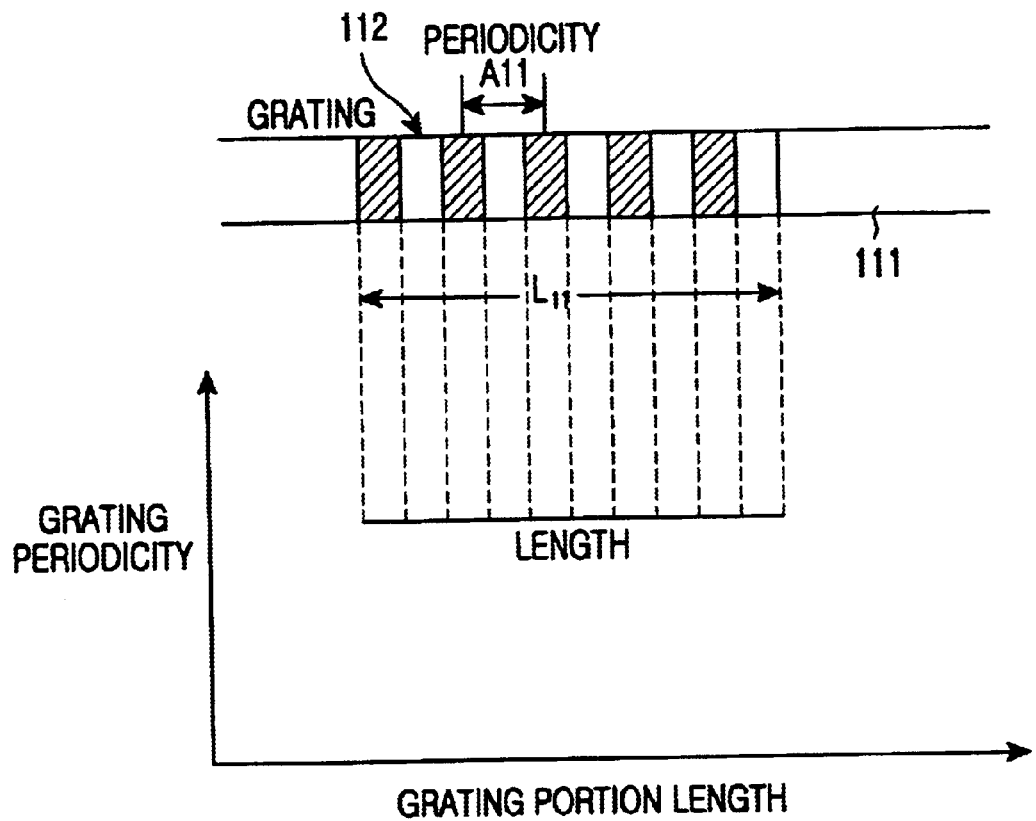
FIG. 1 is a diagram illustrating a long-period grating having constant refractive index modulations according to the prior art.
Figure 2:
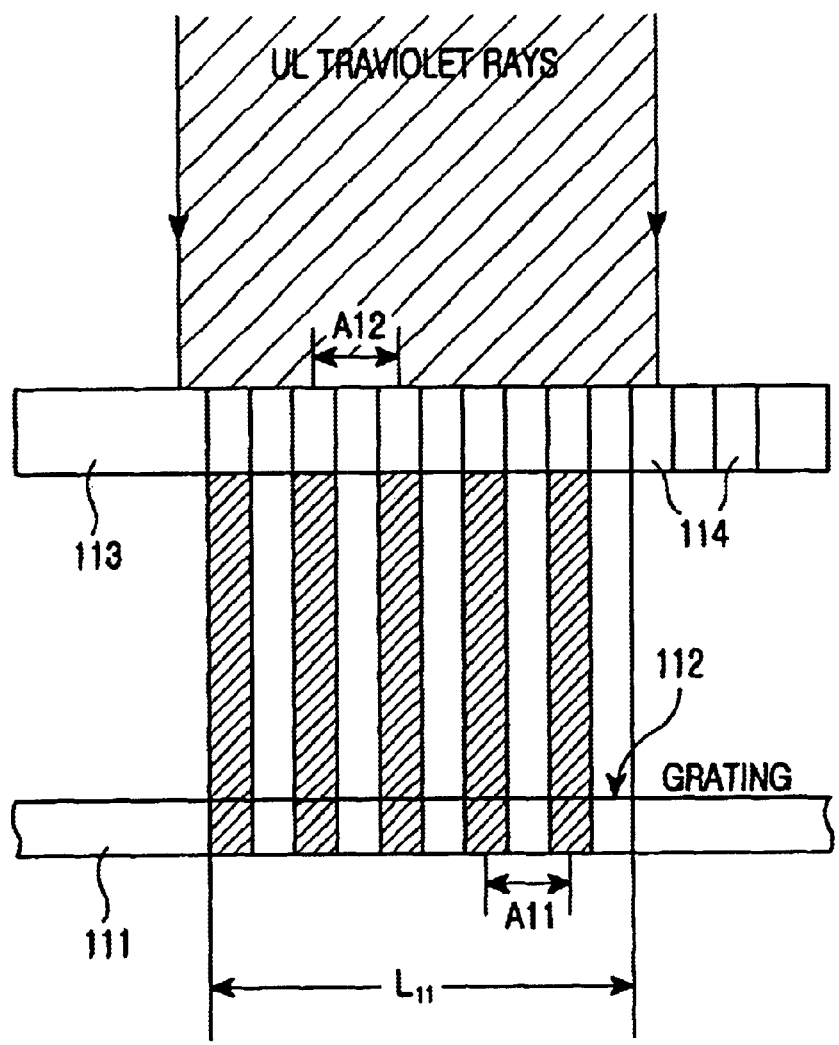
FIG. 2 is a diagram illustrating a method for fabricating the long-period grating shown in FIG. 1.
Figure 3:
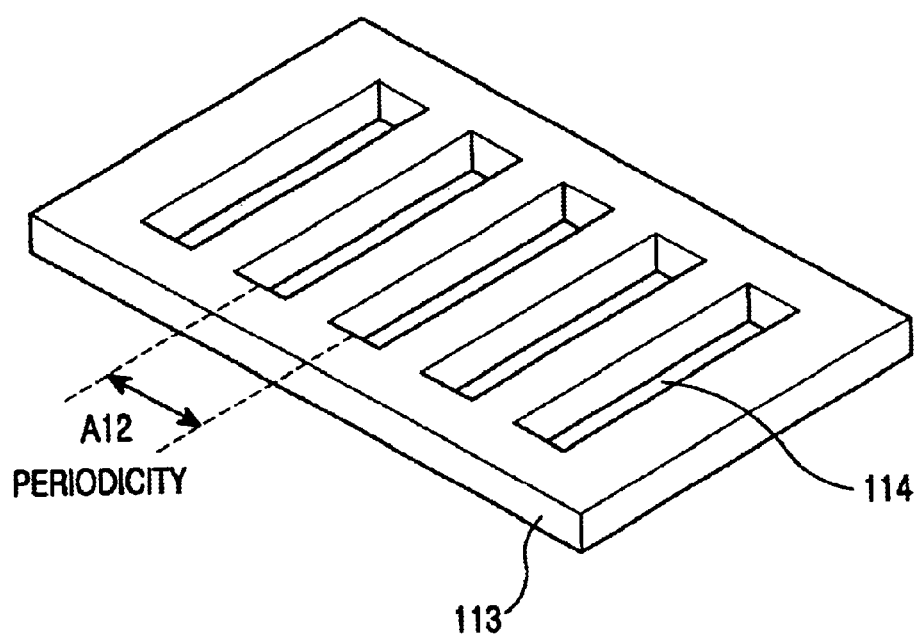
FIG. 3 is a cross view illustrating the amplitude mask shown in FIG. 2.
Figure 4:
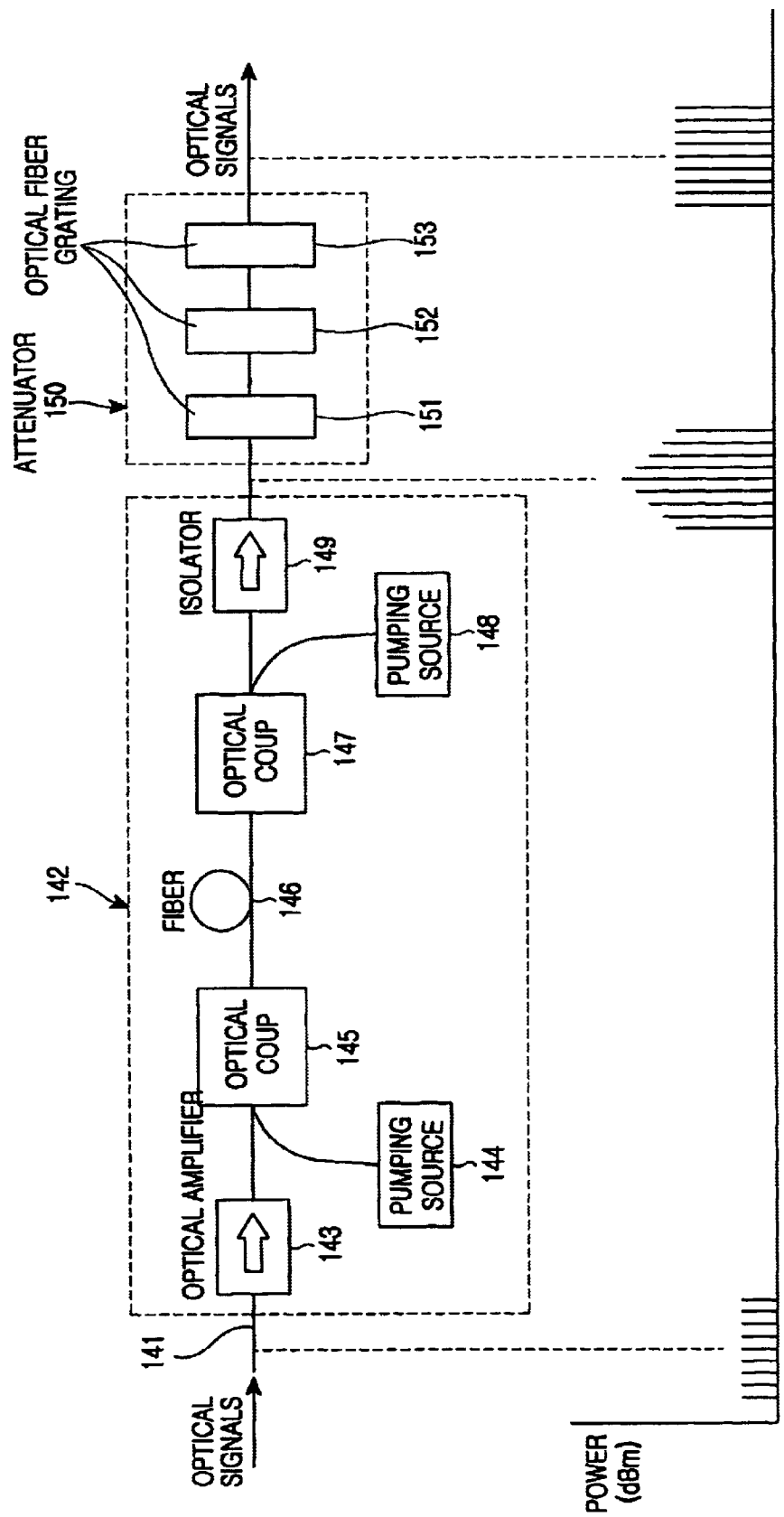
FIG. 4 is a diagram illustrating an optical fiber amplifier with an attenuator according to the prior art.
Figure 5:
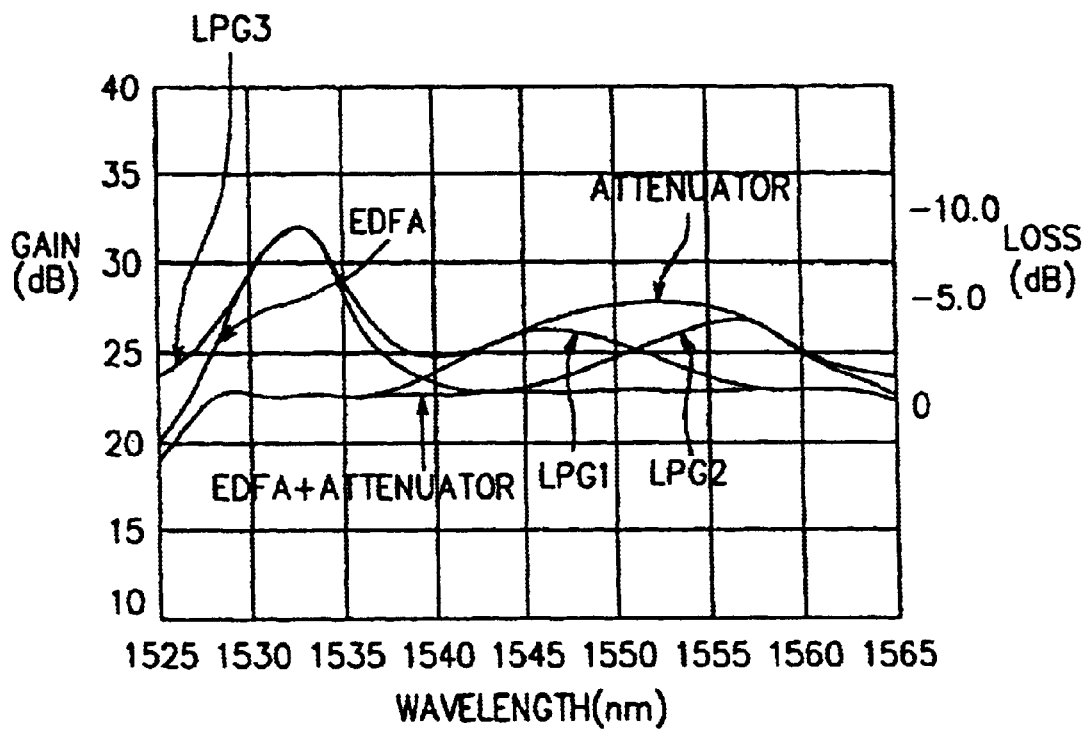
FIG. 5 is a diagram illustrating a process for flattening the gain curve of an erbium-doped optical fiber amplifier using a conventional attenuator.
Figure 6:
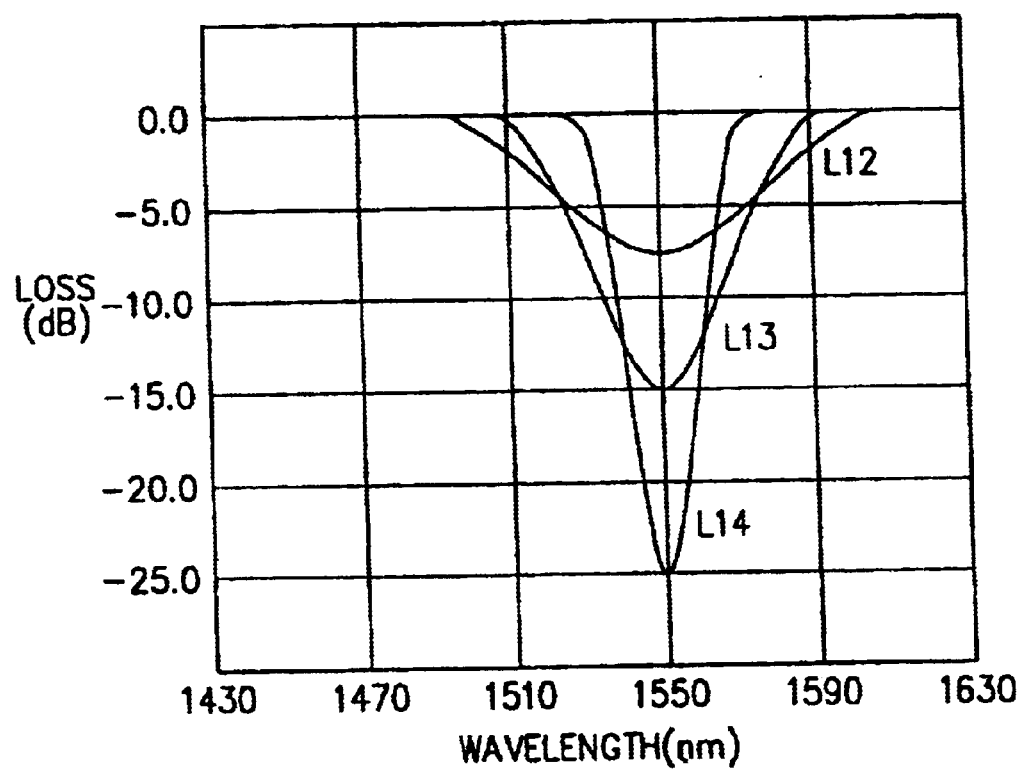
FIG. 6 is a diagram illustrating a varying growth of the loss curve according to a length variance of the long-period grating.

FIG. 6 is a diagram illustrating varying loss curve characteristics according to the length variance of a long-period grating. Referring to FIG. 6, loss curves L12, L13 and L14 are drawn with respect to three, long-period gratings with different lengths, respectively. Here, the respective periodicity and the refractive index modulations of the three long-period gratings are all identical. All shapes of the respective loss curve exhibit the Gaussian-like function. However, the respective lengths L12, L13, and L14 of the long-period gratings have different relation as follows: L12<L13<L14. As shown in FIG. 6, if the length of the long-period grating is longer, the required maximum loss at a peak wavelength is larger and the band width is narrower.

Figure 7:
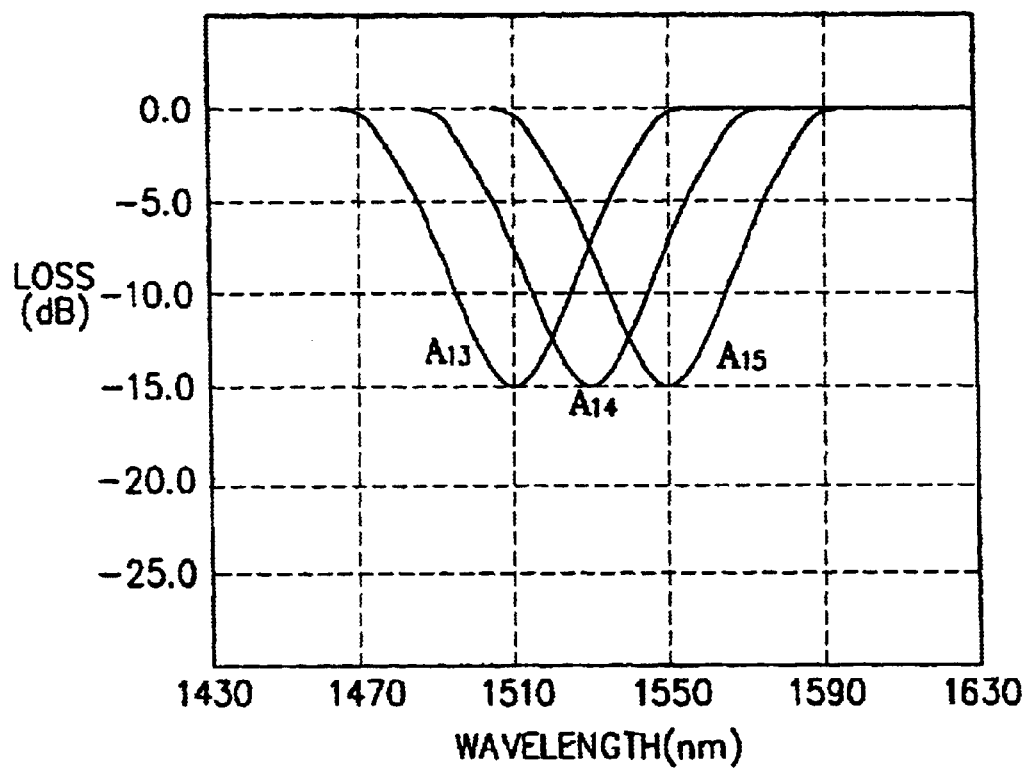
FIG. 7 is a diagram illustrating a varying growth of the loss curve according to a periodicity variance of the long-period grating.

FIG. 7 is a diagram illustrating varying loss curve characteristics according to a periodicity variance of the long-period grating. FIG. 7 illustrates loss curves $A_{13}$, $A_{14}$, and $A_{15}$ with respect to long-period gratings with different periodicities, respectively. Here, the length and refractive index modulations of the three long-period gratings are the same. As the periodicity of the long-period grating becomes longer, the peak wavelength becomes longer. However, the periodicity $A_{13}$, $A_{14}$, and $A_{15}$ of the long-period gratings have the following relation: $A_{13}<A_{14}<A_{15}$.

Figure 8:
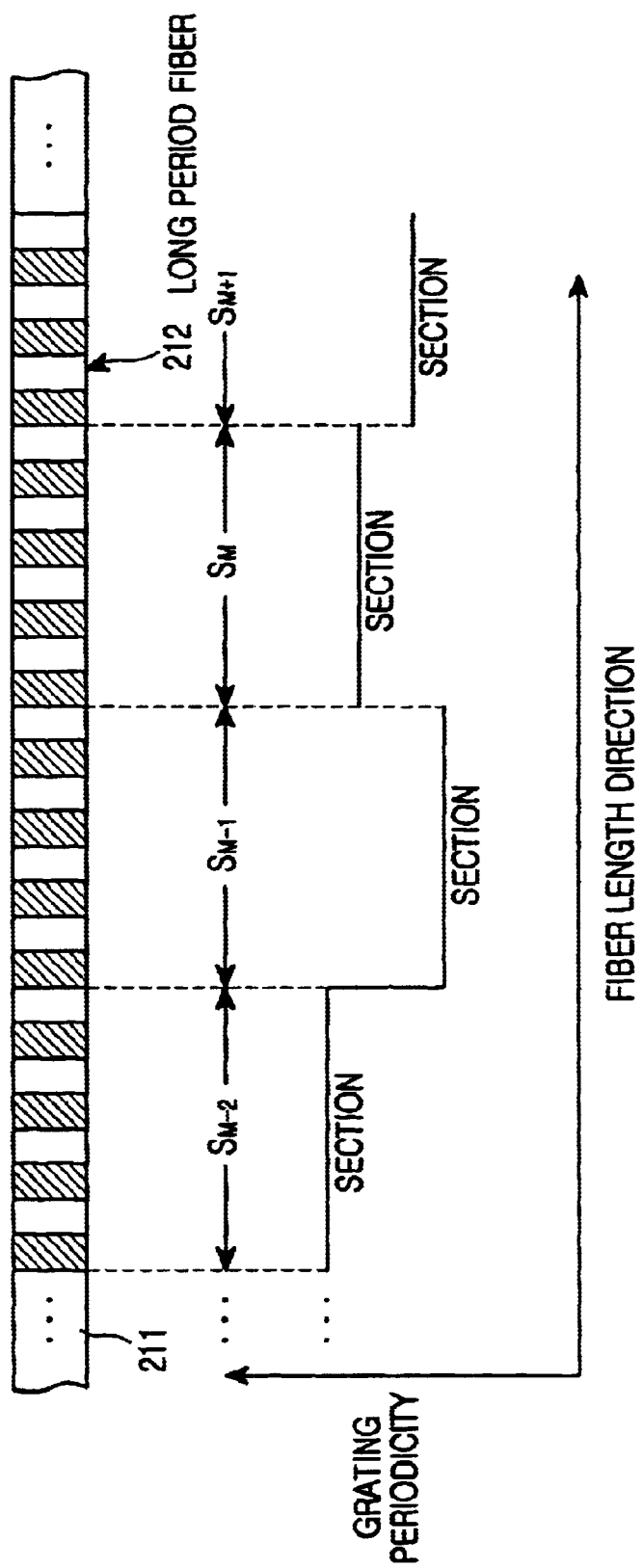
FIG. 8 is a diagram illustrating a long-period grating according to a preferred embodiment of the present invention.

FIGS. 8 is a diagram illustrating an optical fiber grating according to a preferred embodiment of the present invention using the principles described in FIG. 6 and 7. The long-period optical fiber 212 according to the present invention is divided into, for example, thirty sections ($S_1, S_2, \ldots, S_M, \ldots, S_{29}, S_{30}$) along its lengthwise direction. The refractive index modulations of the sections ($S_1, S_2, \ldots, S_M, \ldots, S_{29}, S_{30}$) are the same. The grating periodicity of the thirty sections ($S_1, S_2, \ldots, S_M, \ldots, S_{29}, S_{30}$); however, is not identical. The length plurality of sections having different grating periodicity is twice, or longer, as the grating periodicity within a given section. Thus, a variety of loss curves wavelengths can be realized in the arrangement, as shown in FIG. 8.

TABLE 1 set out below specifies grating periodicity of the respective sections of the long-period optical fiber grating 212.

TABLE 1

| Section No. | Periodicity ($\mu$m) |
| --- | --- |
| 1 | 180.6160 |
| 2 | 182.5627 |
| 3 | 170.3771 |
| 4 | 180.2524 |
| 5 | 179.5322 |
| 6 | 185.5999 |
| 7 | 181.5314 |
| 8 | 172.4302 |
| 9 | 185.1465 |
| 10 | 173.8174 |
| 11 | 189.7991 |
| 12 | 163.7001 |
| 13 | 198.0277 |
| 14 | 174.5773 |
| 15 | 180.2289 |
| 16 | 178.3343 |
| 17 | 181.6744 |
| 18 | 180.8370 |
| 19 | 180.6969 |
| 20 | 185.5999 |
| 21 | 178.4235 |
| 22 | 184.0576 |

TABLE 1-continued

| Section No. | Periodicity ($\mu$m) |
|---|---|
| 23 | 176.4190 |
| 24 | 190.2385 |
| 25 | 173.2020 |
| 26 | 181.6590 |
| 27 | 178.4267 |
| 28 | 189.0535 |
| 29 | 183.4862 |
| 30 | 180.3696 |

Here, the section number represents the sequence order along the lengthwise direction of the long-period optical fiber grating 212.

Figure 9:
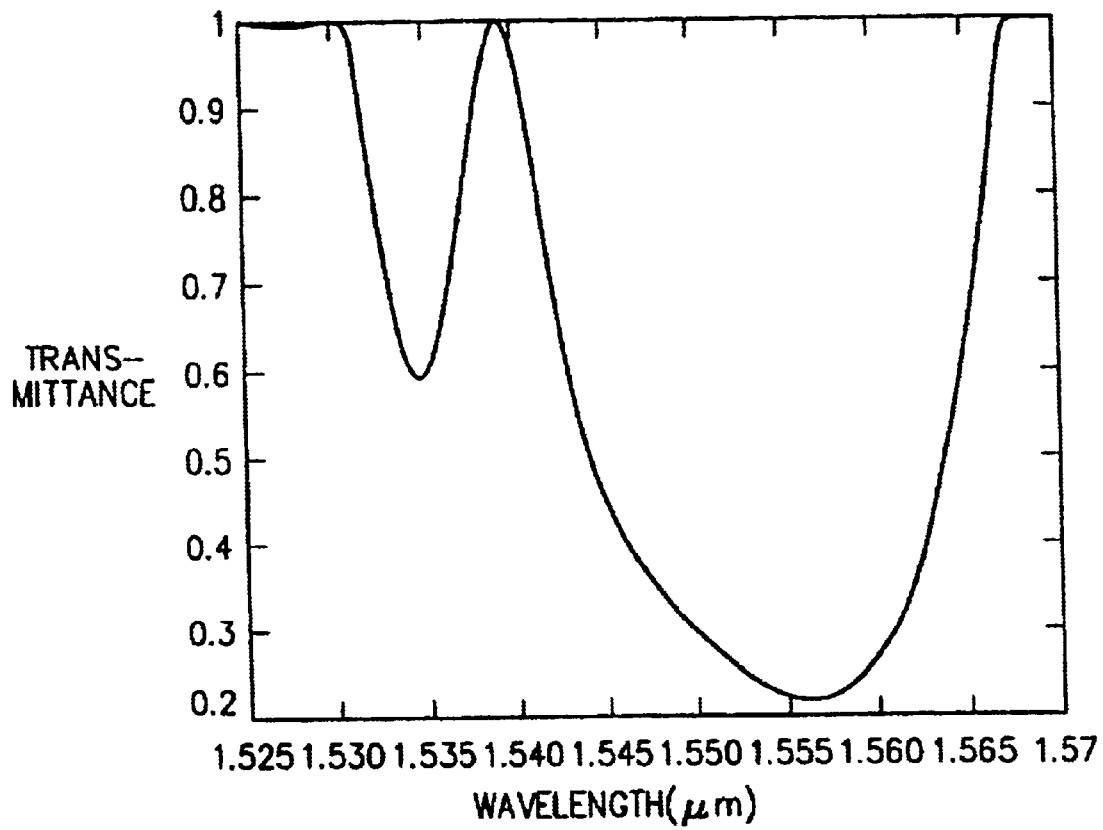
FIG. 9 is a diagram illustrating the transmittance by wavelengths with respect to the long-period grating shown in FIG. 8.

FIG. 9 is a diagram illustrating the transmittance of the long-period grating 212 shown in FIG. 8. Unlike the conventional long-period grating, which exhibits the Gaussian-like function shape with one minimum value, the long-period grating according to the present invention includes two minimum values in the vicinity of 1.535 nm and 1.557 nm. Hence, the transmittance curve is able to be formed using only one long-period grating in the present invention, whereas the prior art system requires at least two gratings to obtain the same transmittance curve characteristic. Accordingly, the transmittance curve by wavelength is able to be realized using only one long-period grating according to the present invention, thus obviating the conventional problem of combining a plurality of long-period gratings.

Figure 10:
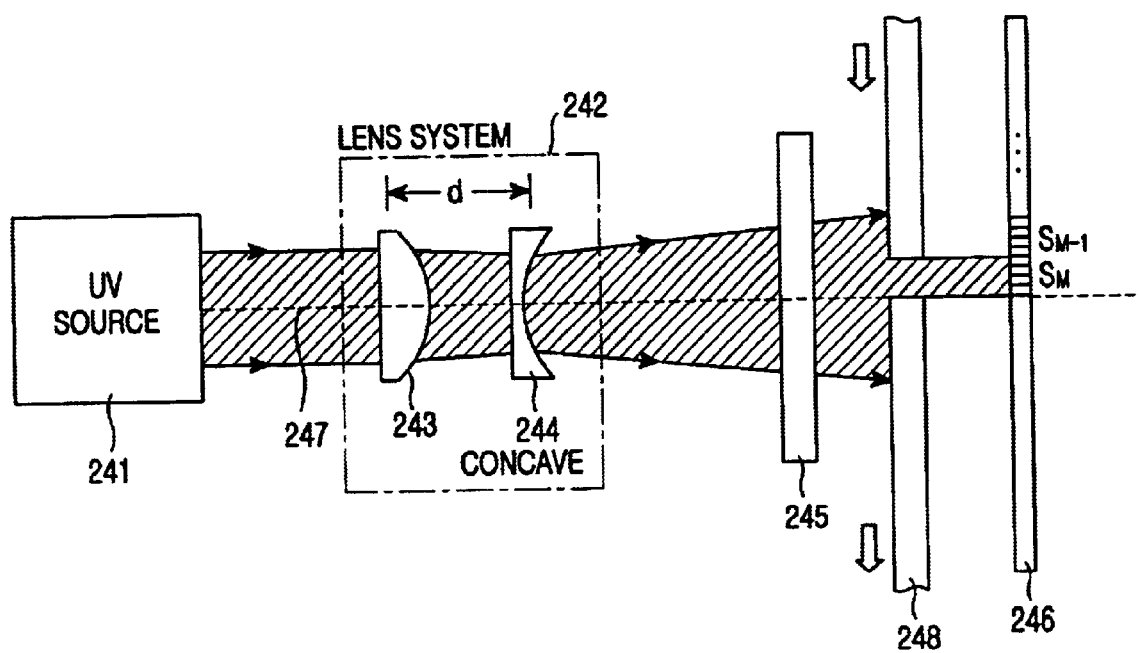
FIG. 10 is a diagram illustrating a device for fabricating the long-period grating according to the present invention; and, FIG. 11 to FIG. 13 are diagrams illustrating the operations of the present invention during the fabrication of the inventive long-period grating shown in FIG. 10.

FIG. 10 is a diagram illustrating a device for fabricating the long-period grating according to the present invention. Ultraviolet rays outputted from an ultraviolet source 241 are emitted to a lens system 242, which includes a plat-convex lens 243 and a plat-concave lens 244. The distance d between the plat-convex lens 243 and the plat-concave lens 244 is selectively adjusted to control the diverging point and converging point of the ultraviolet rays emitted from the plat-concave lens 244. That is, by incorporating the lens system, the light rays generated from the ultraviolet source 241 can be seen as if the light is generated from a particular diverging point or a converging point. Then, the ultraviolet rays emitting from the optical system pass through the amplitude mask 245. Here, the amplitude mask 245 includes a plurality of slits with a specific periodicity therebetween.

Accordingly, the ultraviolet rays passed through the amplitude mask 245 are passed through a layer 248 having a slit 248. Here, the layer 248 having a single slit is configured to prevent the flow of the ultraviolet rays passing through the amplitude mask 245 and allows some rays to be projected to a pertinent section $S_M$ of the fiber 246. In the embodiment of the present invention, the layer 248 maintains its static position for a predetermined time period, then moves to a next section $S_{M+1}$. At the same time when the layer 248 moves the next section, the distance d between the plat-convex lens 243 and the plat-concave lens 244 is also adjusted depending on the desired grating periodicity of the next section $S_{M+1}$. Thus, the grating periodicity of each section defining the long-period gratings along the optical fiber 246 can be varied by controlling the distance d between the plat-convex lens 243 and the plat-concave lens 244.

Figure 11:
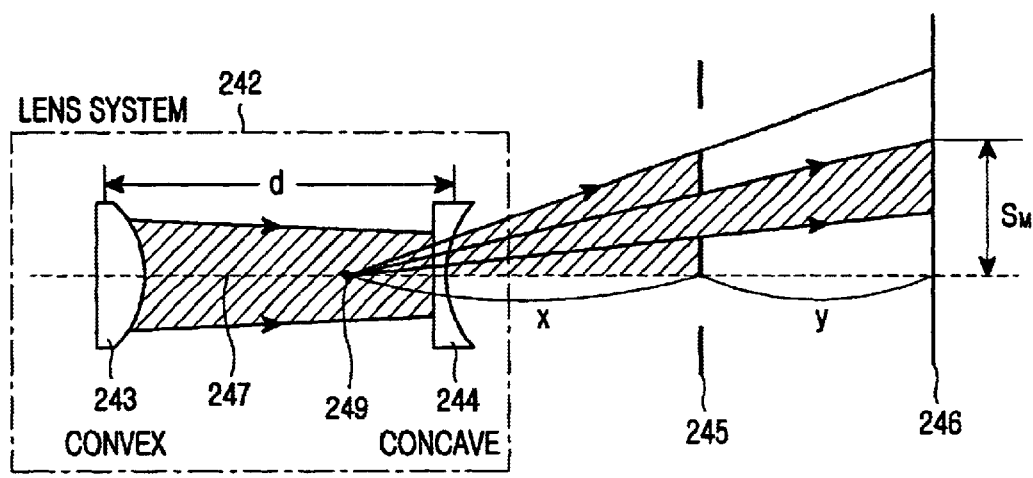
Figure 12:
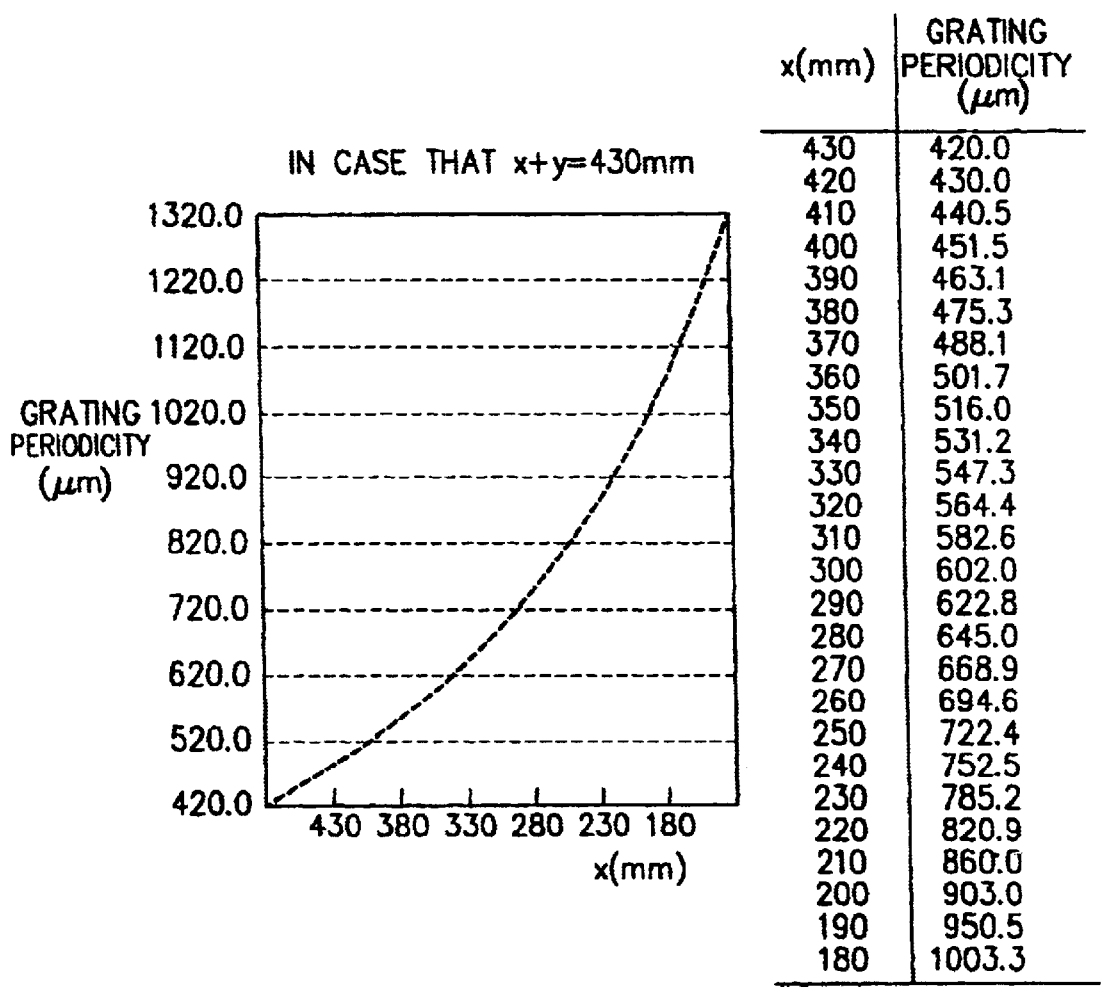
Figure 13:
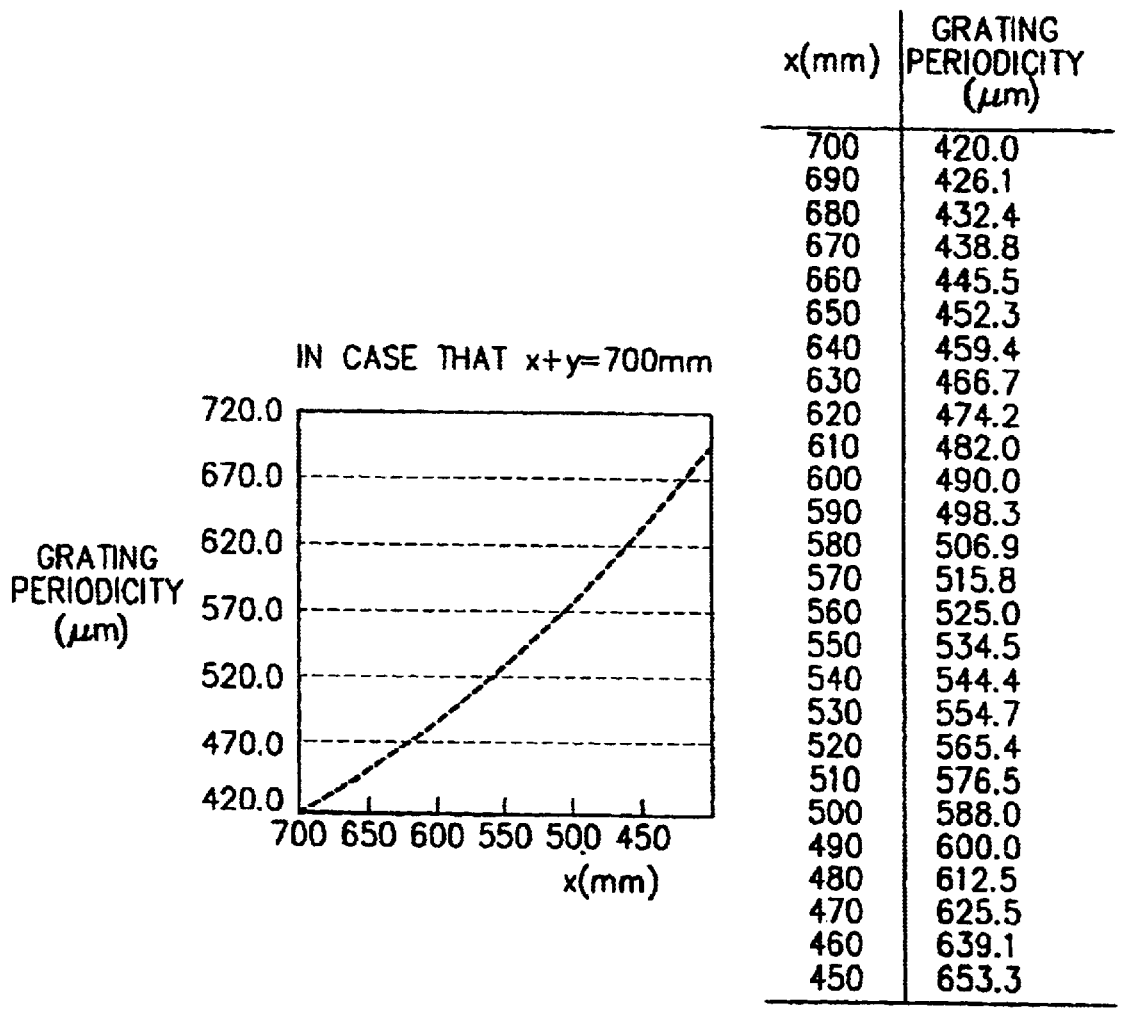

FIG. 11 to FIG. 13 are diagrams illustrating the operation of fabricating the long-period grating shown in FIG. 10. The optical source 241 and the layer 248 in FIG. 10 are omitted for the purpose of clarity. The diverging point 249 of the optical system is movable along the optical axis 247 by controlling the distance between the plat-convex lens 243 and the plat-concave lens 244. The grating periodicity of the pertinent section formed on the optical fiber 246 is selectively adjusted by changing the distance x between the diverging point 249 and the amplitude mask 245, and the distance y between the amplitude mask 245 and the optical fiber 246.

FIG. 12 is a graph illustrating the grating periodicity variance as described above with reference to FIG. 11. Referring to FIG. 12, the distance (x+y) between the diverging point 249 of the optical system 242 and the optical fiber 246 is fixed to be 430 mm, but the distance x between the diverging point 249 and the amplitude mask 245 is varied. As shown in FIG. 12, it is found that as the distance between the diverging point 249 and the amplitude mask 245 becomes shorter, the grating periodicity of the pertinent section becomes longer.

FIG. 13 is a graph illustrating a grating periodicity variance as described above with reference to FIG. 11. Referring to FIG. 13, the distance (x+y) between the diverging point 249 of the optical system 242 and the optical fiber 246 is fixed to be 700 mm, and the distance x between the diverging point 249 and the amplitude 245 is varied. As shown in FIG. 13, it is found just like the result obtained as shown in FIG. 12 that as the distance between the diverging point 249 and the amplitude mask 245 becomes shorter, the grating periodicity of the pertinent section becomes longer.

So far, according to the present invention, the method used to form the long-period grating is characterized as irradiating the ultraviolet rays to the photosensitive optical fiber. However, the long-period grating according to the present invention can be realized in various other ways. For example, a residual stress may be used to form the long-period grating. Typically, the refractive index of an optical fiber core is decreased due to the residual stress generated by a drawing tension under a photoelastic effect. If laser beams are irradiated to the optical fiber to relax one portion of the residual stress of the optical fiber core on a constant periodicity basis, the refractive index of the irradiated optical fiber core is varied, thereby serving to form the optical fiber grating. The residual stress is classified into a thermal stress and a mechanical stress with the former caused by the difference between thermal expansion coefficients of the core and the clad, whereas the latter caused is by the difference between viscosity coefficients of the core and the clad. The residual stress is relaxed by irradiating the laser beams to the optical fiber where the residual stress exists as stated in the preceding paragraphs, or by transferring the thermal energy of an electric arc to the optical fiber where the residual stress exists by the means of the electric arc.

As described above, the optical fiber grating includes a plurality of sections having different grating periodicity whose distribution is asymmetrical around a particular reference section whose length is twice or longer, as the grating periodicity, thereby enabling the realization of a variety of loss curves by wavelengths.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for fabricating a long-period grating along an optical fiber utilizing a lens system of the type having a light source configured to generate a light signal, a first lens for coupling the light generated by said light source into a first substantially cylindrical wave, a second lens for diffracting the light emerged from said first lens into a second substantially cylindrical wave, an amplitude mask having an array of slits for directing said substantially cylindrical wave emerged from said second lens, a layer having a slit and disposed between said first light modulator and said optical fiber, said method comprising the steps of:

(a) exposing a first region of said optical fiber to the light pattern outputted from the slits of said amplitude mask via said layer for a first predetermined time period;

(b) adjusting the distance between said first lens and said second lens at a prescribed increment to modify the grating periodicity that is formed along said fiber;

(c) moving said layer in front of said optical fiber at said prescribed increment to allow the light outputted through said layer is exposed to a second region of said optical fiber, said second region is adjoined to said first region; and, (d) exposing said second region of said optical fiber to the light outputted from the slits of said layer for a second predetermined time period.

2. The method of claim 1, further comprising the step of repeating steps (a)–(d) thereafter in a repeat fashion.

3. The method of claim 1, wherein the grating periodicity formed along said optical fiber becomes longer as the distance between said first lens and said second lens becomes shorter.

4. The method of claim 1, wherein the shape of said slits of said amplitude mask includes a specific periodicity.

5. The method of claim 1, wherein the light pattern outputted from the array of slits of said amplitude mask via said layer is substantially similar to the patterns formed along said optical fiber.

6. A long-period optical fiber grating produced by the method of claim 1.

7. An optical fiber produced by the method of claim 1.

8. A long-period optical fiber grating produced by the method of claim 1, wherein said grating includes a plurality of sections having different grating periodicity formed by steps (a)–(d), and wherein the length of said section being twice or longer than the grating periodicity within said section.

9. A long-period optical fiber grating comprising a plurality of sections having a different grating periodicity, said section being adjoined to each other in a repeat fashion, wherein the length of said section being twice or longer than the grating periodicity within said section and the grating is formed by selectively irradiating ultraviolet rays via a first lens, a second lens and an amplitude mask having an array of slits to said optical fiber, wherein a distance between said first and second lens is adjusted at a prescribed increment to modify the grating periodicity that is formed along said optical fiber.

10. The grating of claim 9, wherein refractive index modulations of the respective said section are identical.

11. The grating of claim 9, wherein the lengths of the respective said section are identical.

12. The grating of claim 9, wherein said long-period optical fiber grating is formed by periodically relaxing a residual stress of said optical fiber.

13. The grating of claim 12, wherein the residual stress of said optical fiber is periodically relaxed by irradiating laser beams thereto.

14. The grating of claim 12, wherein the residual stress of said optical fiber is periodically relaxed by means of an electric arc.

15. The grating of claim 9, wherein said long-period optical fiber grating is formed by selectively irradiating ultraviolet rays via an amplitude mask to a photosensitive optical fiber.

* * * * *